United States Patent
Ogata et al.

(10) Patent No.: US 10,613,806 B2
(45) Date of Patent: Apr. 7, 2020

(54) CONTROL DEVICE AND PROCESSING APPARATUS SYSTEM

(71) Applicant: FUJI XEROX CO., LTD., Tokyo (JP)

(72) Inventors: Naoya Ogata, Yokohama (JP); Hajime Kajiyama, Yokohama (JP); Hideki Fujimoto, Yokohama (JP); Kunitoshi Yamamoto, Yokohama (JP); Akira Ichikawa, Yokohama (JP); Mariko Miyazaki, Yokohama (JP); Tetsuya Kobayashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 260 days.

(21) Appl. No.: 15/379,092

(22) Filed: Dec. 14, 2016

(65) Prior Publication Data

US 2017/0337022 A1 Nov. 23, 2017

(30) Foreign Application Priority Data

May 23, 2016 (JP) ................................. 2016-102243

(51) Int. Cl.
G06F 3/12 (2006.01)
B25J 5/00 (2006.01)
H04N 1/00 (2006.01)

(52) U.S. Cl.
CPC ............ *G06F 3/1279* (2013.01); *B25J 5/007* (2013.01); *G06F 3/126* (2013.01); *G06F 3/1212* (2013.01); *G06F 3/1285* (2013.01); *G06F 3/1291* (2013.01); *G06F 3/1292* (2013.01); *G06F 3/1296* (2013.01); *H04N 1/00068* (2013.01); *H04N 1/00931* (2013.01); *H04N 1/00954* (2013.01)

(58) Field of Classification Search
CPC .... G06F 3/1279; G06F 3/1285; G06F 3/1291; G06F 3/126; G06F 3/1296; G06F 3/1212; G06F 3/1292; H04N 1/00931; H04N 1/00954; H04N 1/00068; B25J 5/007
See application file for complete search history.

(56) References Cited

U.S. PATENT DOCUMENTS

| | | | | |
|---|---|---|---|---|
| 5,179,637 A * | 1/1993 | Nardozzi | ............... | G06F 3/1211 345/505 |
| 5,525,031 A * | 6/1996 | Fox | ........................ | B65H 39/11 399/404 |
| 6,369,909 B1 * | 4/2002 | Shima | ................... | G06F 3/1206 358/1.13 |

(Continued)

FOREIGN PATENT DOCUMENTS

JP 2001-125646 A 5/2001

OTHER PUBLICATIONS

Jul. 10, 2017 Extended Search Report issued in European Patent Application No. 16204816.9.

*Primary Examiner* — Jason Holloway
(74) *Attorney, Agent, or Firm* — Oliff PLC

(57) ABSTRACT

A control device includes: a receiving unit that receives a request for processing; a determination unit that determines a processing apparatus to be moved from among a plurality of processing apparatuses based on a predetermined standard in a case where the receiving unit receives a request for processing; and a control unit that controls movement of the processing apparatus based on a result of determination performed by the determination unit.

5 Claims, 15 Drawing Sheets

(56) References Cited

U.S. PATENT DOCUMENTS

| | | | | |
|---|---|---|---|---|
| 6,498,454 | B1* | 12/2002 | Pinlam | H01M 10/44 320/107 |
| 7,725,212 | B2* | 5/2010 | Prasse | B25J 5/007 700/214 |
| 9,525,787 | B2* | 12/2016 | Bakthavachalu | H04N 1/00307 |
| 9,937,621 | B2* | 4/2018 | Zevenbergen | B25J 5/00 |
| 2003/0139844 | A1* | 7/2003 | Carlson | H04N 1/00127 700/213 |
| 2003/0212472 | A1* | 11/2003 | McKee | G05D 1/0274 700/245 |
| 2006/0044596 | A1* | 3/2006 | Ota | H04N 1/00204 358/1.15 |
| 2006/0244991 | A1* | 11/2006 | Tenger | G06F 3/122 358/1.15 |
| 2007/0146780 | A1* | 6/2007 | Miwa | B42C 19/02 358/1.15 |
| 2007/0293978 | A1* | 12/2007 | Wurman | G05B 19/4189 700/213 |
| 2012/0026536 | A1* | 2/2012 | Shah | G06F 3/1206 358/1.15 |
| 2013/0123981 | A1* | 5/2013 | Lee | H04W 4/02 700/248 |
| 2015/0378652 | A1* | 12/2015 | Sakurai | H04N 1/00307 358/1.15 |
| 2017/0038923 | A1* | 2/2017 | Tsuzuki | G06F 3/0482 |
| 2017/0057081 | A1* | 3/2017 | Krohne | B25J 9/0084 |
| 2018/0001660 | A1* | 1/2018 | Liao | B41J 29/393 |

* cited by examiner

CONTROL DEVICE AND PROCESSING APPARATUS SYSTEM

CROSS-REFERENCE TO RELATED APPLICATIONS

This application is based on and claims priority under USC 119 from Japanese Patent Application No. 2016-102243, filed on May 23, 2016.

BACKGROUND

Technical Field

The present invention relates to a control device and a processing apparatus system.

SUMMARY

According to an aspect of the invention, there is provided a control device including: a receiving unit that receives a request for processing; a determination unit that determines a processing apparatus to be moved from among a plurality of processing apparatuses based on a predetermined standard in a case where the receiving unit receives a request for processing; and a control unit that controls movement of the processing apparatus based on a result of determination performed by the determination unit

BRIEF DESCRIPTION OF THE DRAWINGS

Exemplary embodiment(s) of the present invention will be described in detail based on the following figures, wherein.

DETAILED DESCRIPTION

Next, exemplary embodiments of the present invention will be described with reference to the drawings.

Figure 1:
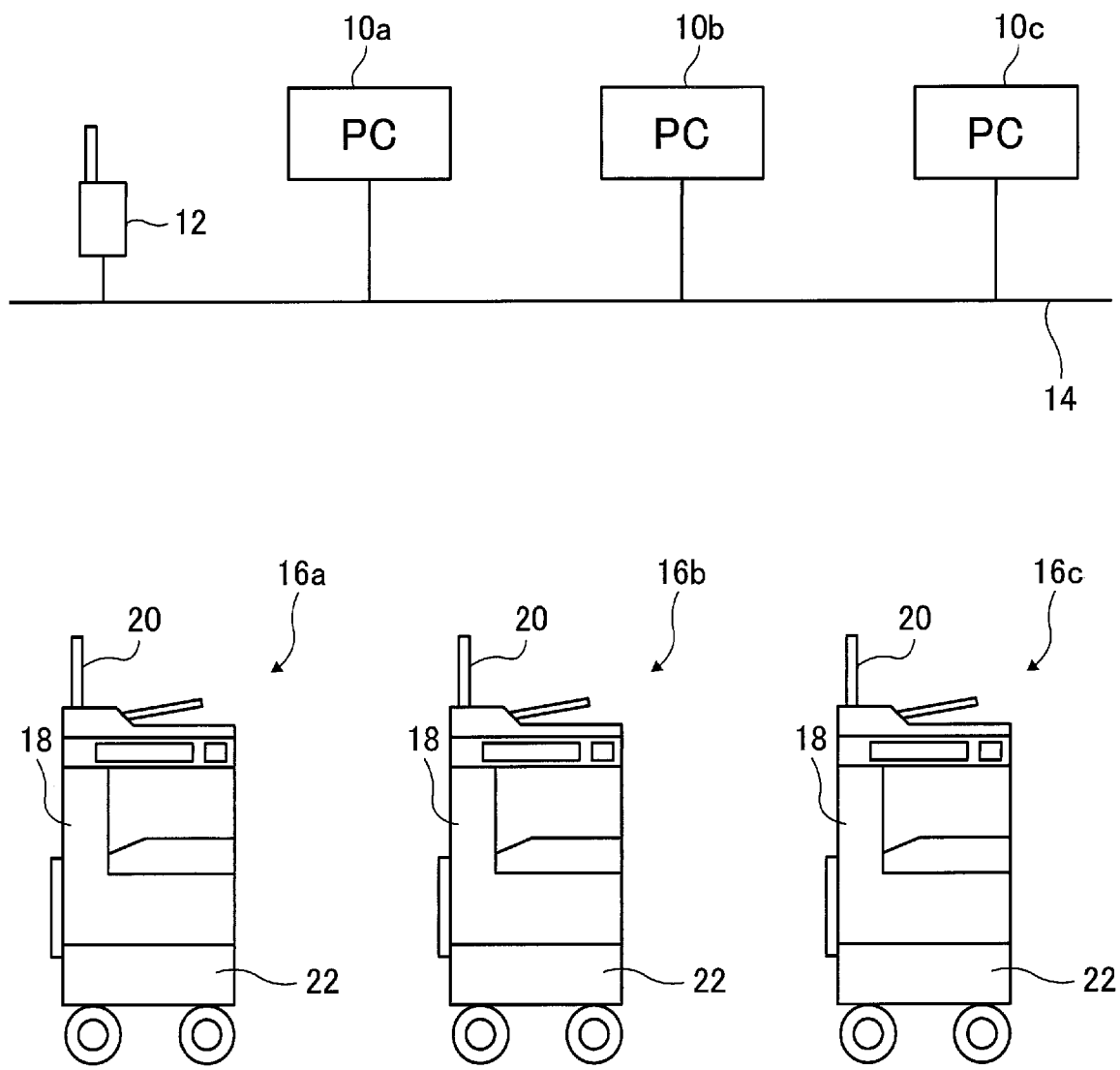
FIG. 1 is a system diagram illustrating a configuration of a processing apparatus system according to an exemplary embodiment of the present invention.

FIG. 1 is a system diagram illustrating a configuration of a processing apparatus system according to an exemplary embodiment of the present invention.

In a processing apparatus system according to the exemplary embodiment of the present invention, three personal computers 10a to 10c and a wireless LAN terminal 12 are connected to each other via a network 14, for example. In addition, three mobile image forming apparatuses 16a, 16b, and 16c transmit and receive printing data and the like to and from the wireless LAN terminal 12.

The personal computers 10a to 10c transmit printing data created by each user to the image forming apparatuses 16a, 16b, and 16c.

Each of the image forming apparatuses 16a, 16b, and 16c includes a main body portion 18, a wireless communication unit 20, and a mobile device 22. The main body portion 18 prints printing data received by the wireless communication unit 20 on a paper sheet using a portion for image forming. The mobile device 22 moves the image forming apparatuses 16a, 16b, and 16c when receiving a movement command from a control device 24, which will be described later.

Figure 2:
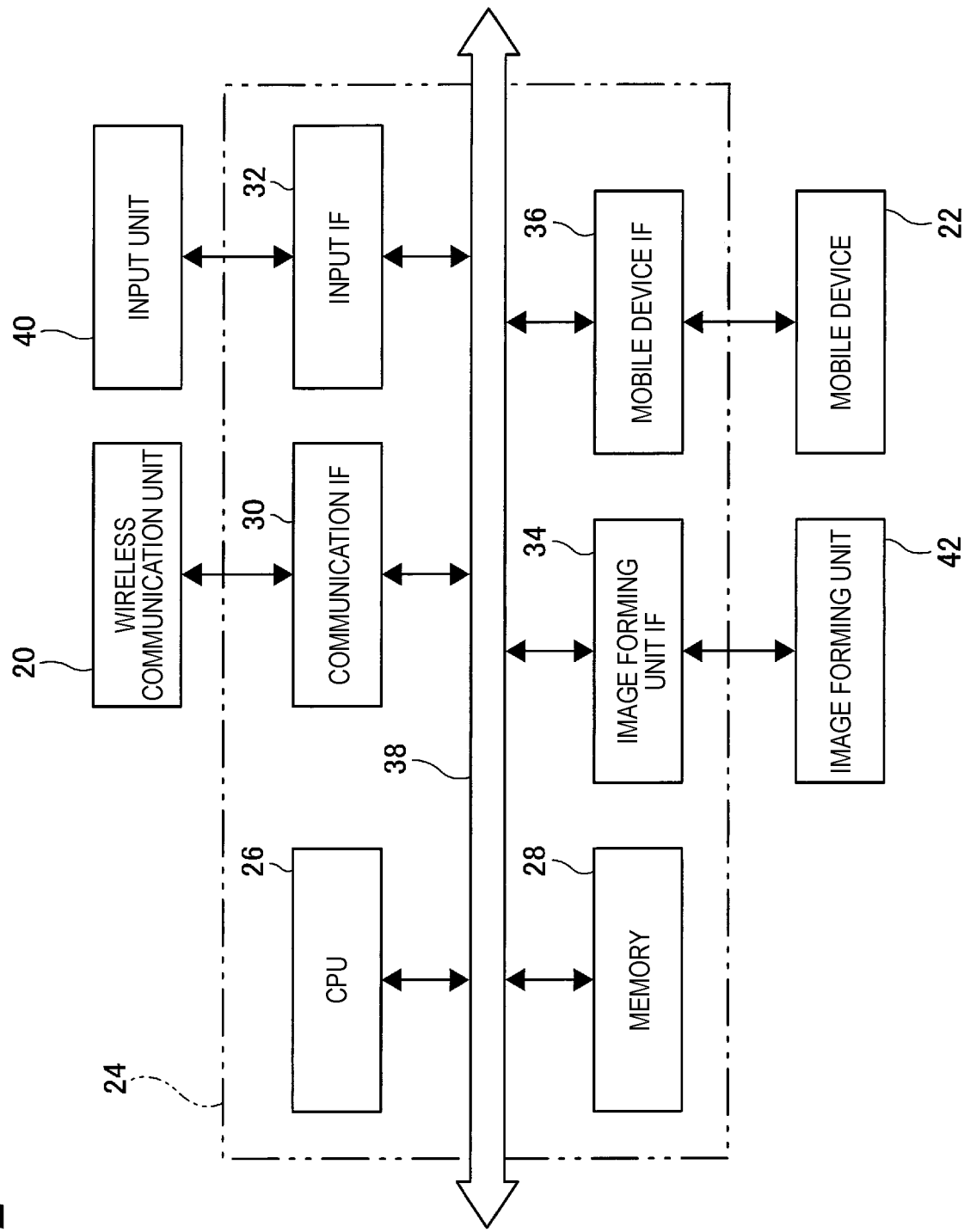
FIG. 2 is a block diagram illustrating a hardware configuration of an image forming apparatus according to the exemplary embodiment of the present invention.

FIG. 2 is a block diagram illustrating a control unit of the image forming apparatuses 16a, 16b, and 16c.

The control device 24 includes a CPU 26, a memory 28, a communication interface 30, an input interface 32, an image forming unit interface 34, and a mobile device interface 36 which are connected to each other via a control bus 38.

The CPU 26 executes predetermined processing on the basis of a control program stored in the memory 28. The communication interface 30 is connected to the wireless communication unit 20 and performs data communication via the wireless communication unit 20. The input interface 32 is connected to an input unit 40 and receives input information from the input unit 40. The input unit 40 includes an ID input portion to which an ID of a user is input through an IC card, for example. The image forming unit interface 34 is connected to an image forming unit 42, and the image forming unit 42 forms an image on a recording medium. The mobile device interface 36 is connected to the mobile device 22. The mobile device 22 is controlled on the basis of the movement command from the CPU 26.

Figure 3:
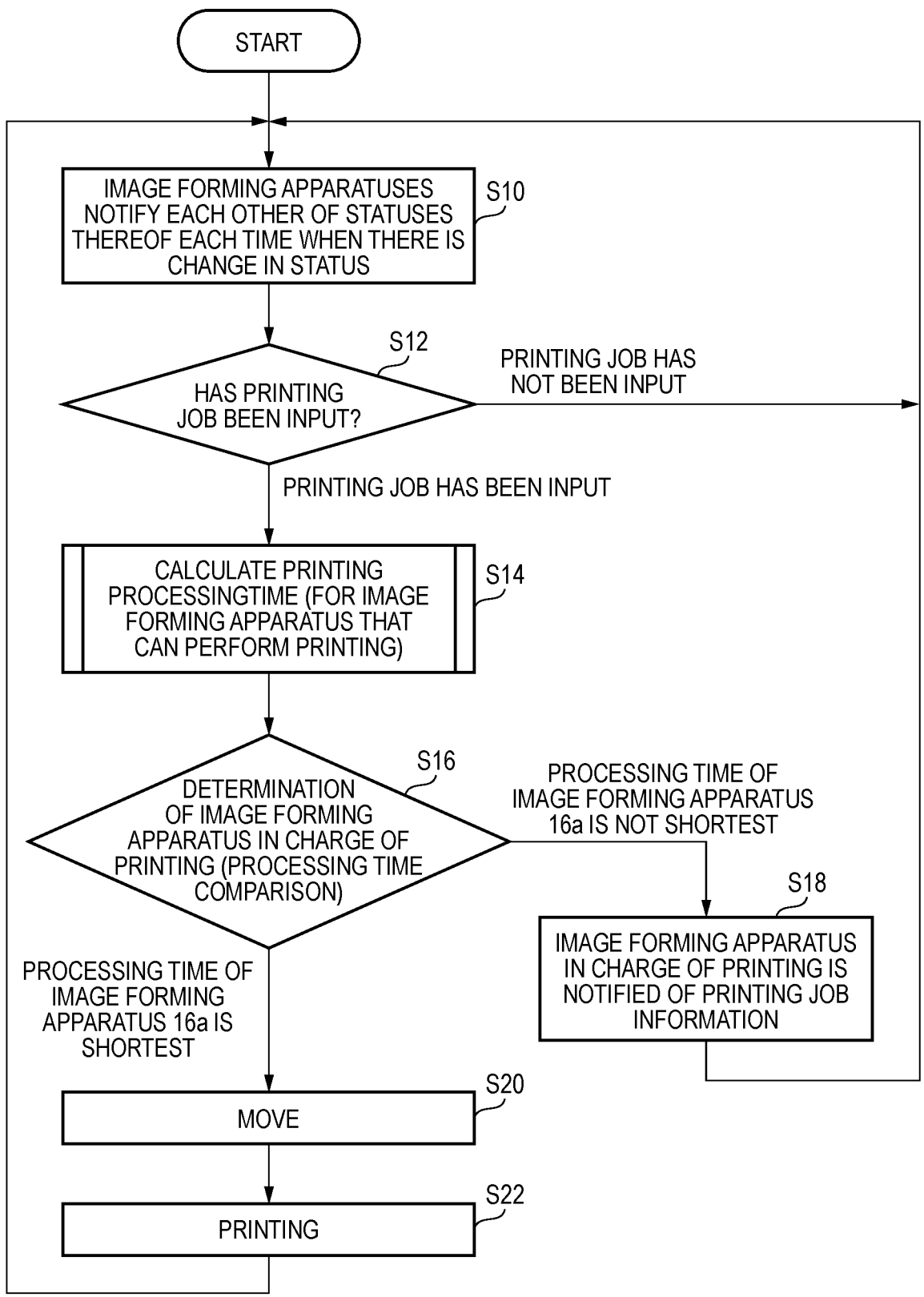
FIG. 3 is a flowchart illustrating a control flow of a control device according to a first exemplary embodiment of the present invention.

FIG. 3 is a flowchart illustrating a first exemplary embodiment of a control flow of the control device 24.

The first exemplary embodiment is related to a case where the image forming apparatuses share respective statuses thereof with each other.

Figure 4A:
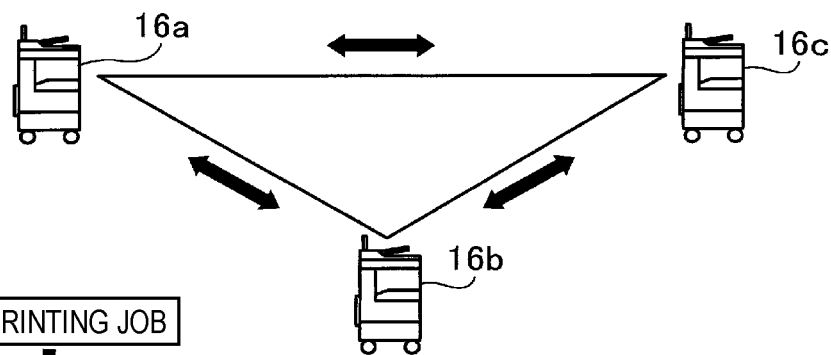
FIGS. 4A to 4E are configuration diagrams illustrating processing between image forming apparatuses according to the first exemplary embodiment of the present invention.

First, in Step S10, as illustrated in FIG. 4A, the image forming apparatuses 16a, 16b, and 16c notify each other of the statuses thereof each time when there is a change in status. The status includes a current location, performance, a function, the status of a current printing job, or the like.

The performance includes warm-up time, first copy out time, and continuous copy speed of the image forming apparatuses 16a, 16b, and 16c.

The warm-up time is a period of time from when the apparatus is powered to when the apparatus becomes available. The first copy out time is a period of time from when a start button of an image forming apparatus is pushed to when the first copy is discharged. The continuous copy speed refers to the number of consecutive copies which are discharged within one minute from discharge of the first copy. The continuous copy speed depends on which of monochrome printing and color printing is used and depends on the size of a paper sheet.

In addition, the functions of the image forming apparatuses 16a, 16b, and 16c includes dual side printing, N-up printing, color printing, the size of a printing paper, printing resolution, and the like. The functions of the image forming apparatuses 16a, 16b, and 16c may further include the type of a printing paper, post processing, or the like.

The N-up printing is a printing technique in which N pages of document are printed on one paper sheet.

The status of the printing job includes the number of pages to be printed in a printing job belonging to a printing job queue which has not been executed yet, printing settings (dual side printing, N-up printing, color printing, paper sheet size, resolution, or the like), post processing settings, or the like.

As described above, the image forming apparatuses 16a, 16b, and 16c communicate with each other. Therefore, one image forming apparatus 16a holds status information of other image forming apparatuses 16b and 16c.

Figure 4B:
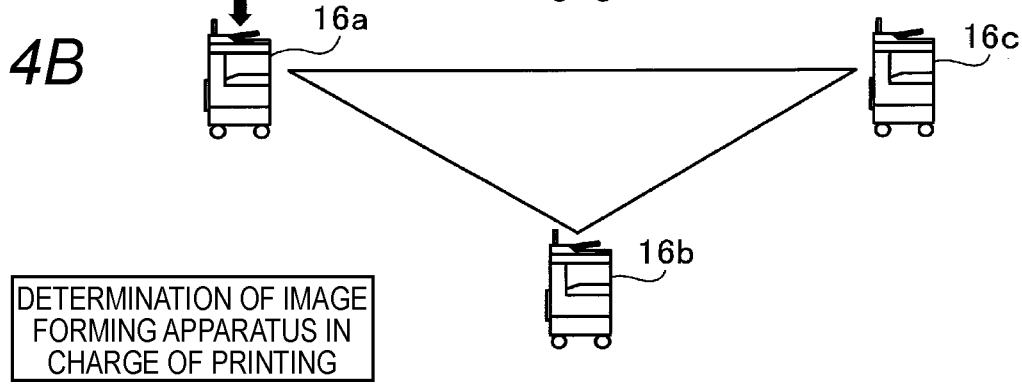

Next, in Step S12, it is determined whether a printing job has been input to the image forming apparatuses 16a, 16b, and 16c. In a case where it is determined that a printing job has not been input to the image forming apparatuses 16a, 16b, and 16c, the processing returns to Step S10 and the image forming apparatus 16a stands by until a printing job is input. When a printing job is input to the one image forming apparatus 16a as illustrated in FIG. 4B, the processing proceeds to Step S14.

Next, in Step S14, printing processing times of the image forming apparatuses 16a, 16b, and 16c are calculated. The one image forming apparatus 16a to which the printing job is input holds information related to the status of the other image forming apparatuses 16b and 16c. Accordingly, the image forming apparatus 16a calculates the printing processing times of the other image forming apparatuses 16b and 16c also.

Note that, the calculation is performed with respect to an image forming apparatus that can perform printing. For example, the calculation is not performed with respect to a failed image forming apparatus or an image forming apparatus without a function of executing a requested printing job.

Figure 5:
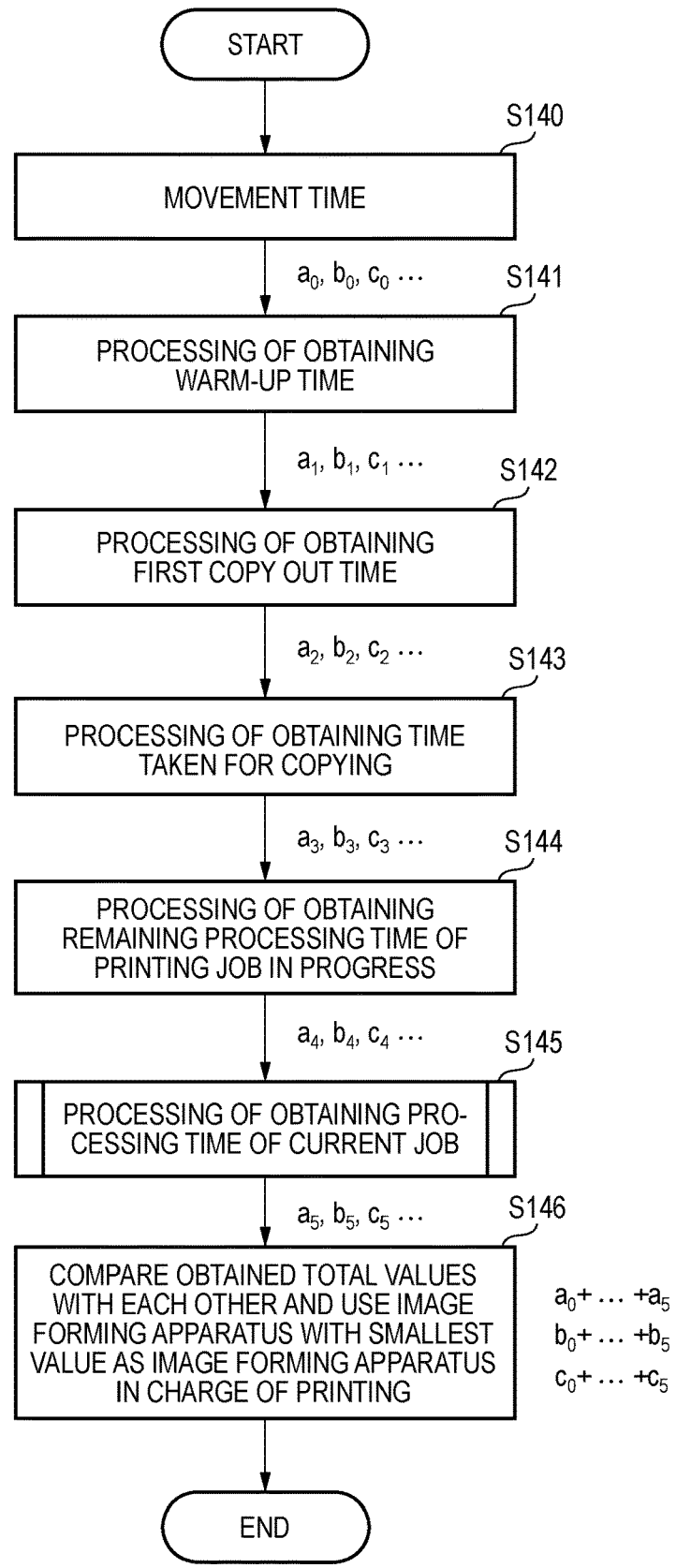
FIG. 5 is a flowchart for calculating processing time according to the first exemplary embodiment of the present invention.

For the calculation of printing processing time, as illustrated in FIG. 5, first, in Step S140, respective movement times $a_0, b_0, c_0 \ldots$ and so forth between the image forming apparatuses 16a, 16b, and 16c and a user are calculated. The movement times $a_0, b_0, c_0 \ldots$ and so forth are calculated on the basis of moving routes between the locations (usually, home position) of the image forming apparatuses 16a, 16b, and 16c and the location of the user.

Next, in Step S141, processing of obtaining warm-up times $a_1, b_1, c_1 \ldots$ and so forth is performed. Next, in Step S142, processing of obtaining first copy out times $a_2, b_2, c_2, \ldots$ and so forth is performed. Next, in Step S143, processing of obtaining times taken for copying $a_3, b_3, c_3, \ldots$ and so forth from the continuous copy speed is performed. Next, in Step S144, processing of obtaining remaining processing times $a_4, b_4, c_4, \ldots$ and so forth of a printing job in progress is performed. Next, in Step S145, processing of obtaining processing times $a_5, b_5, c_5, \ldots$ and so forth of an input printing job is performed. Next, in Step S146, total values $a_0+ \ldots +a_5$, $b_0+ \ldots +b_5$, and $c_0+ \ldots +c_5$ are calculated, and the obtained total values are used as printing processing times.

Figure 6:
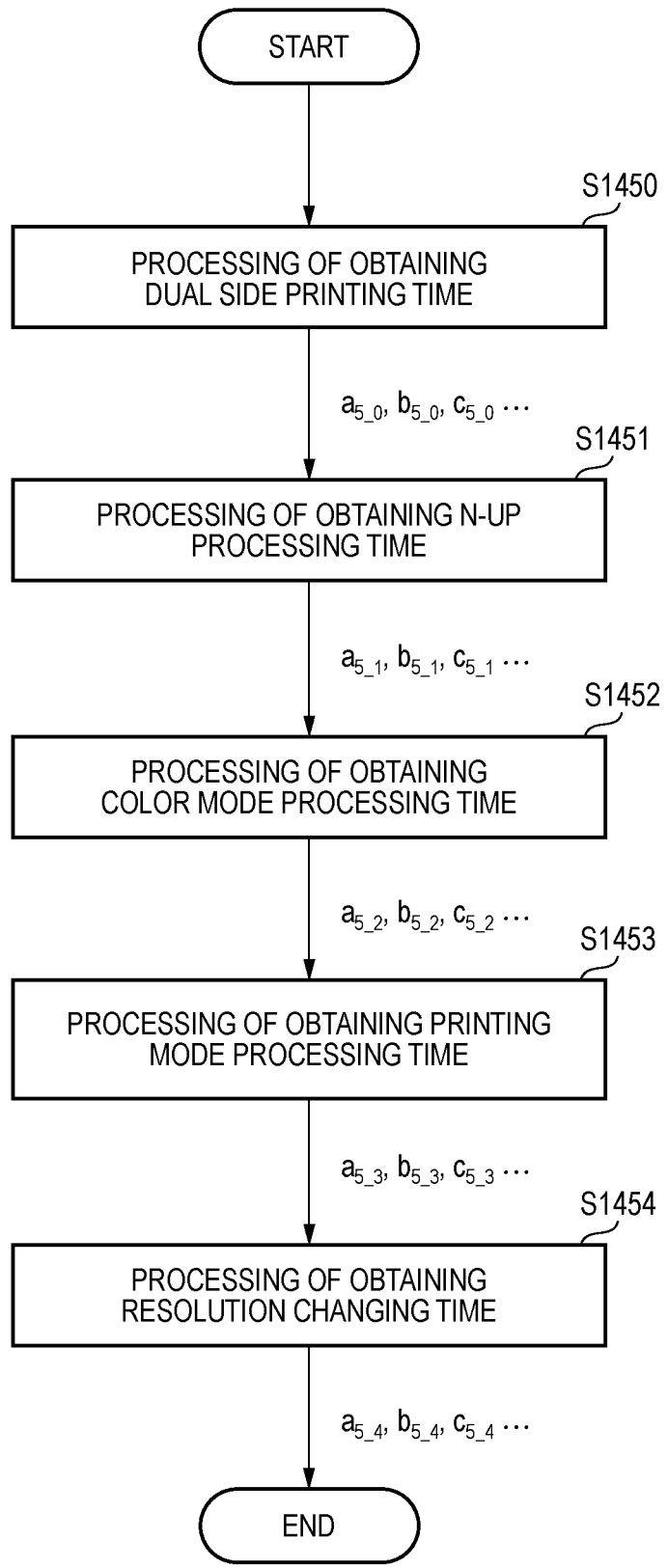
FIG. 6 is a flowchart for obtaining processing time for a current printing job according to the first embodiment of the invention.

As illustrated in FIG. 6, the processing times $a_5, b_5, c_5, \ldots$ and so forth of a printing job are obtained through processing of obtaining dual side printing times $a_{5\_0}, b_{5\_0}, c_{5\_0} \ldots$ and so forth in Step S1450, processing of obtaining N-up processing times $a_{5\_1}, b_{5\_1}, c_{5\_1} \ldots$ and so forth in Step S1451, processing of obtaining color mode processing times $a_{5\_2}, b_{5\_2}, c_{5\_2} \ldots$ and so forth in Step S1452, processing of obtaining printing mode processing times $a_{5\_3}, b_{5\_3}, c_{5\_3} \ldots$ and so forth in Step S1453, and processing of obtaining resolution changing times $a_{5\_4}, b_{5\_4}, c_{5\_4} \ldots$ and so forth in Step S1454.

Figure 4C:
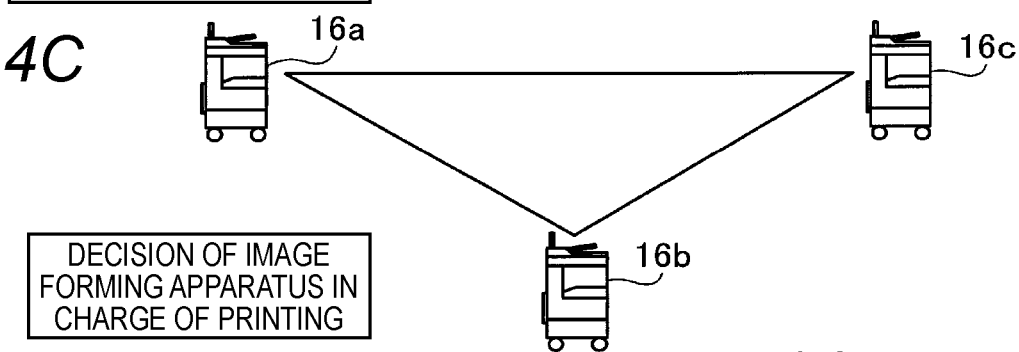
Figure 4D:
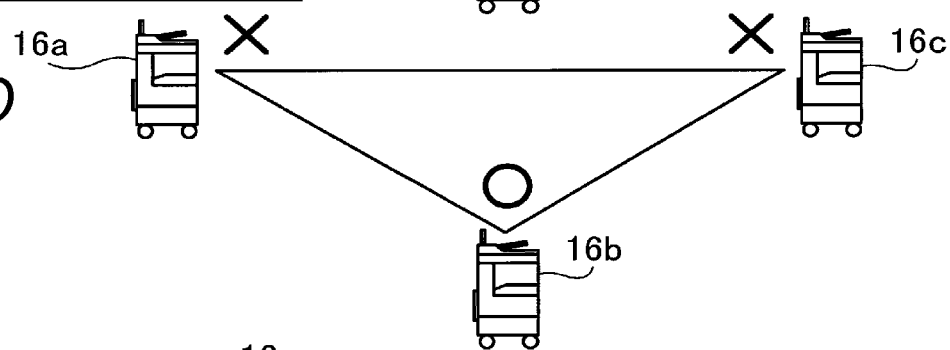

Returning to FIG. 3, in Step S16, the image forming apparatus 16a determines whether the image forming apparatus 16a is an image forming apparatus in charge of printing on the basis of the printing processing time obtained in Step S14. As illustrated in FIG. 4C, the image forming apparatus 16a can calculate the printing processing times of the other image forming apparatuses 16b and 16c also. Here, as illustrated in FIG. 4D, the image forming apparatus 16b with the shortest printing processing time is decided to be in charge of printing.

Figure 4E:
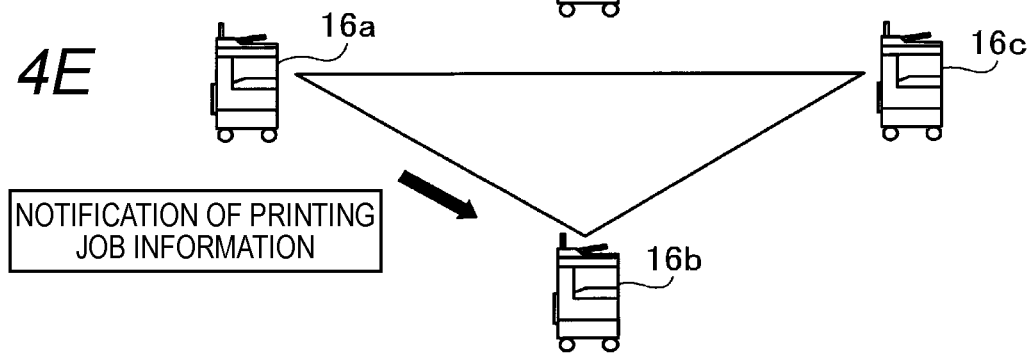

When it is determined that the image forming apparatus 16a is not an image forming apparatus in charge of printing in Step S16, the processing proceeds to Step S18, and as illustrated in FIG. 4E, the image forming apparatus 16b, which is an image forming apparatus in charge of printing, is notified of the printing job.

On the other hand, when it is determined that the image forming apparatus 16a is an image forming apparatus in charge of printing in Step S16, the processing proceeds to Step S20 and the image forming apparatus 16a moves to the location of the user. Then, the processing proceeds to Step S22 and the image forming apparatus 16a performs printing. Thereafter, the processing returns to Step S10.

In the description of the first exemplary embodiment, a case where one image forming apparatus is in charge of printing has been described. Hereinafter, a case where a printing job of printing plural pages is divided and assigned to plural image forming apparatuses.

FIGS. 7A to 7D illustrate a case where a printing job of printing three pages is output to an output destination (location of user) using the three image forming apparatuses 16a, 16b, and 16c. In FIGS. 7A to 7D, the vertical axis represents time, black blocks represent the movement time, and "1p", "2p", and "3p" represent printing processing times of printed pages 1p, 2p, and 3p, respectively.

For simplification, it is assumed that the image forming apparatuses 16a, 16b, and 16c are the same in movement speed and processing speed.

Figure 7:
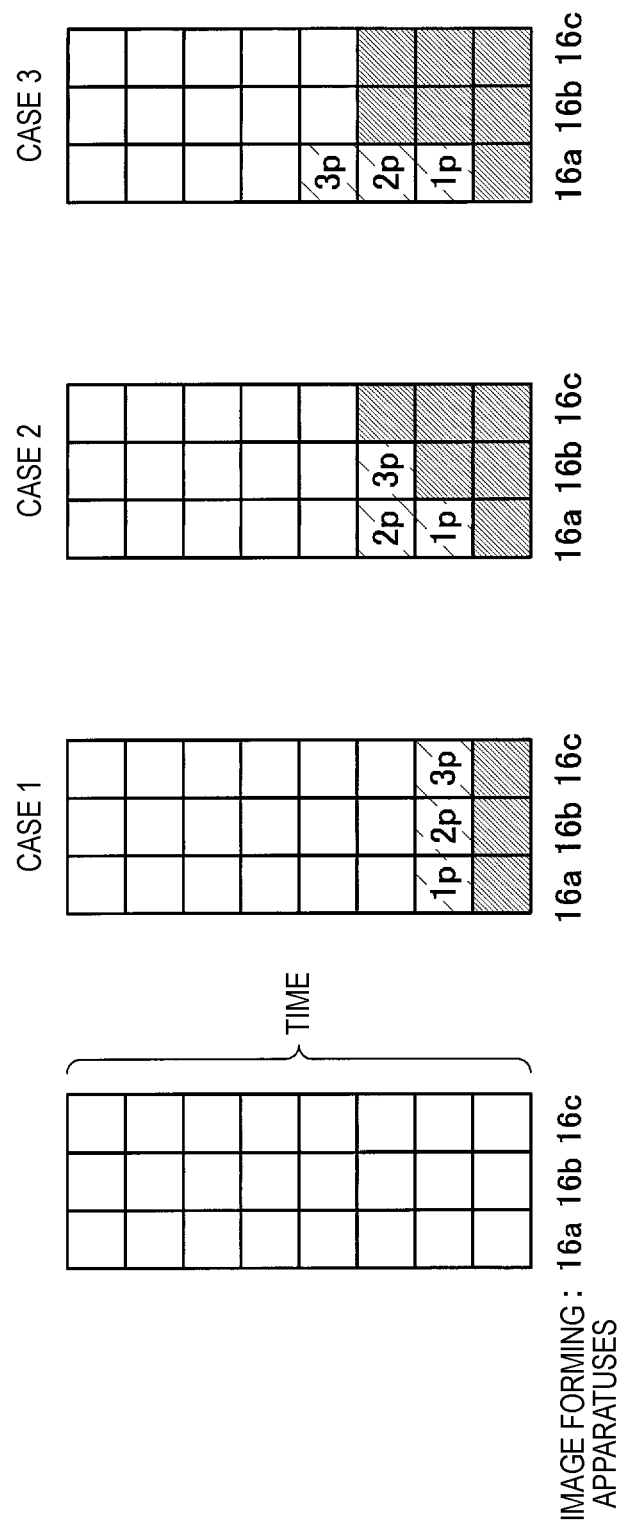
FIGS. 7A to 7D are conceptual diagrams illustrating a case where a printing job of printing plural pages is assigned to plural image forming apparatuses.

A case 1 in FIG. 7B is related to a case where the image forming apparatuses 16a, 16b, and 16c are positioned being separated from the output destination by the same distance. In this case, a printing job of printing one page is assigned to each of the image forming apparatuses 16a, 16b, and 16c so that the output operation is finished in the least amount of time.

A case 2 in FIG. 7C is related to a case where the distances to the output destination are set such that "a distance between the output destination and the image forming apparatus 16a"<"a distance between the output destination and the image forming apparatus 16b"<"a distance between the output destination and the image forming apparatus 16c". In this case, a printing job of printing two pages is assigned to the image forming apparatus 16a, a printing job of printing one page is assigned to the image forming apparatus 16b, and a printing job of printing zero pages is assigned to the image forming apparatus 16c so that the output operation is finished in the least amount of time.

A case 3 in FIG. 7D is related to a case where the image forming apparatus 16a is most close to the output destination and the image forming apparatuses 16b, and 16c are positioned being separated from the output destination by the same distance. In this case, a printing job of printing three pages is assigned to the image forming apparatus 16a and a printing job of printing zero pages is assigned to each of the image forming apparatuses 16b and 16c so that the output operation is finished in the least amount of time.

As described above, after a graph is obtained on the basis of the movement times, printing jobs are assigned to the image forming apparatuses in ascending order of movement time so that the output operation of the printing jobs is finished in the least amount of time.

A case where plural printing jobs are input in an actual office will be described.

Figure 8:
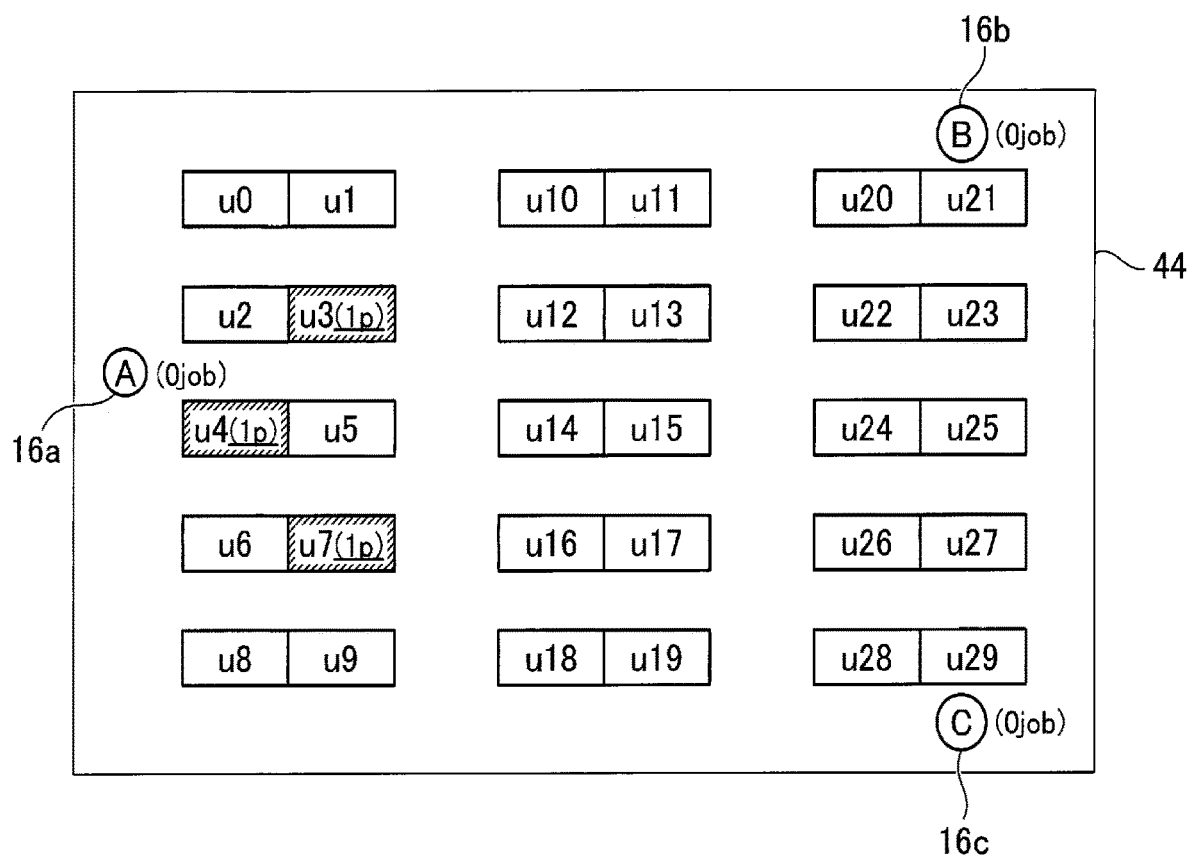
FIG. 8 is a configuration diagram illustrating the disposition of three image forming apparatuses and three users in an office.

In FIG. 8, the three image forming apparatuses 16a, 16b, and 16c are disposed in an office 44. A home position of the image forming apparatus 16a is the center of a left end of the office 44. In addition, the home positions of the image forming apparatuses 16b and 16c are close to upper and lower corners of a right end of the office 44, respectively.

Figure 9:
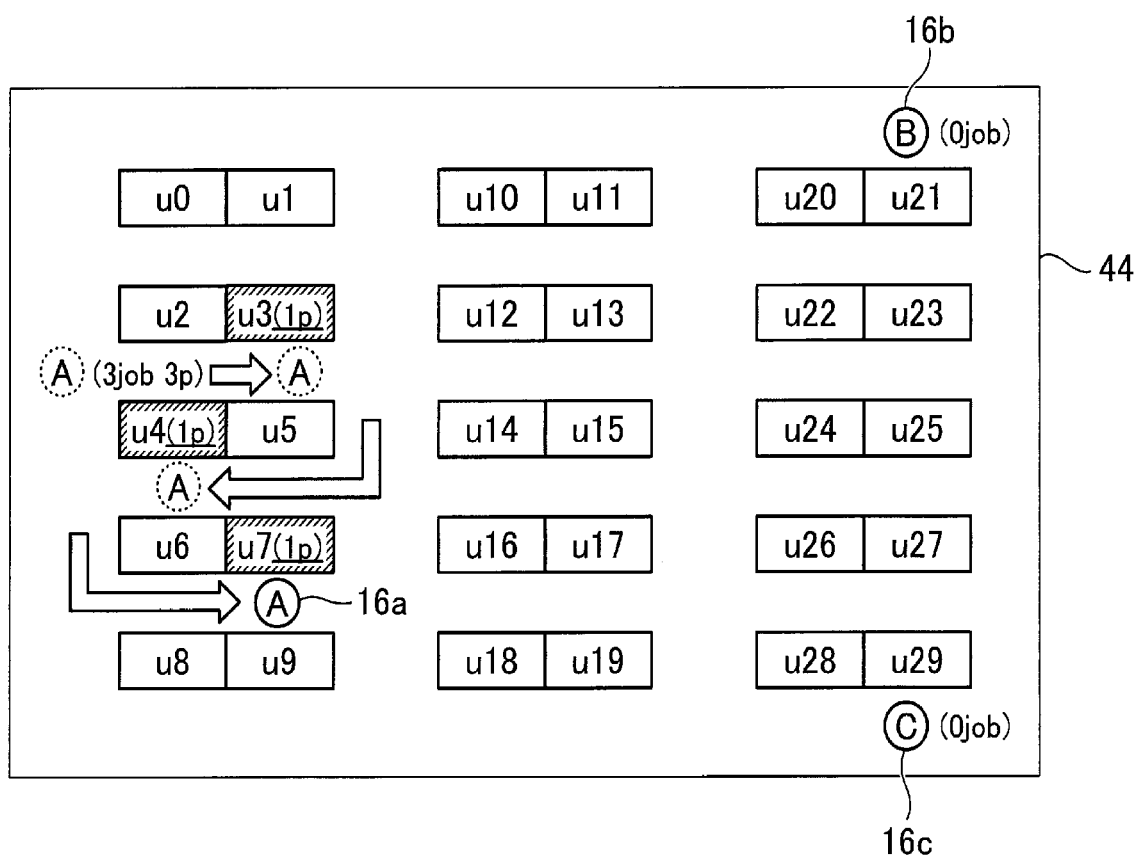
FIG. 9 is a configuration diagram illustrating moving routes of the image forming apparatuses in a case where each of the three users inputs a printing job of one page in the office.

Here, as illustrated in FIG. 8, it is assumed that each of three users u3, u4, and u7, who are located close to the image forming apparatus 16a, has input a printing job of printing one page. In this case, a calculation result indicates that the printing processing time becomes the shortest in a case where the image forming apparatus 16a moves to the three users u3, u4, and u7 as illustrated in FIG. 9. Therefore, the image forming apparatus 16a moves to the users u3, u4, and u7 according to a moving route illustrated in FIG. 9 and the image forming apparatus 16a executes three printing jobs alone.

Figure 10:
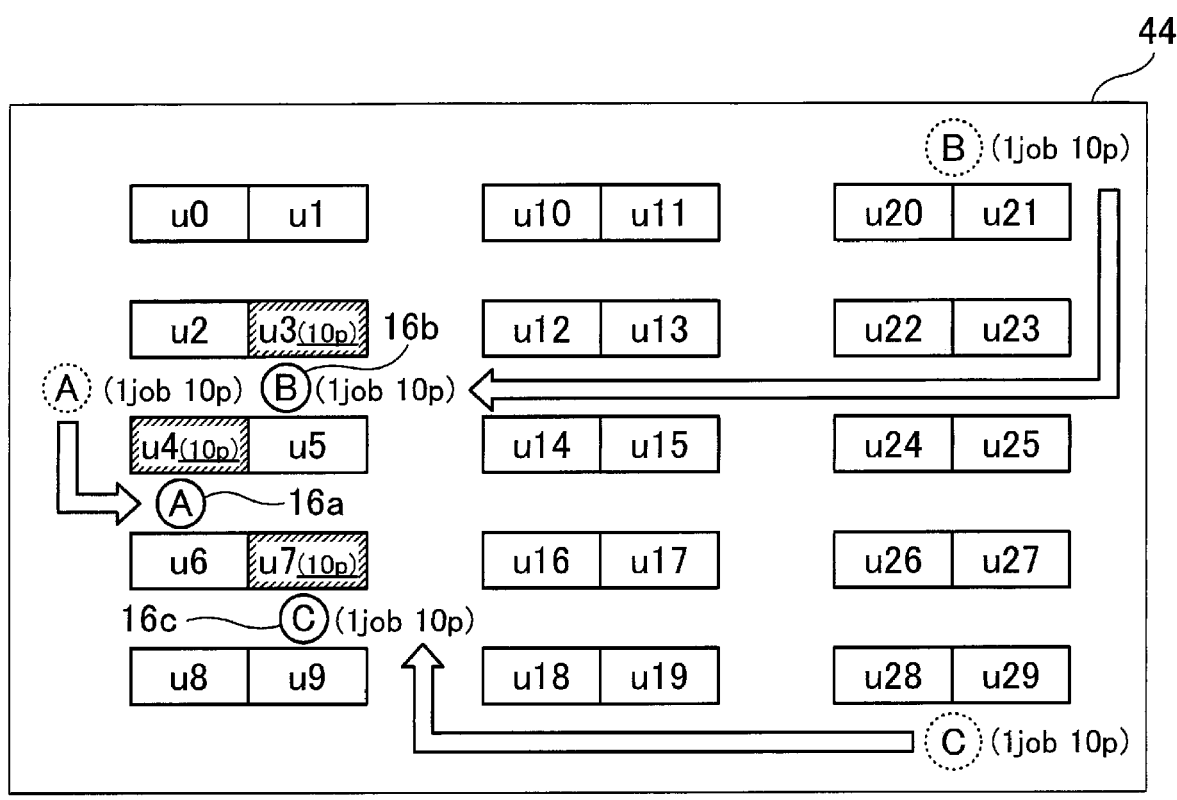
FIG. 10 is a configuration diagram illustrating moving routes of the image forming apparatuses in a case where each of the three users inputs a printing job of ten pages in the office.

Next, it assumed that each of the three users u3, u4, and u7 has input a printing job of printing ten pages, similar to above. In this case, printing jobs are finished in the least amount of time when the image forming apparatus 16a is in charge of a printing job of the user u4 who is most close to the image forming apparatus 16a, the image forming apparatus 16b is in charge of a printing job of the user u3, and the image forming apparatus 16c is in charge of a printing job of the user u7 as illustrated in FIG. 10. This is because the image forming apparatuses 16b and 16c can move to the locations of the users u3 and u4 respectively before the image forming apparatus 16a finishes the printing job of the user u7.

Figure 11:
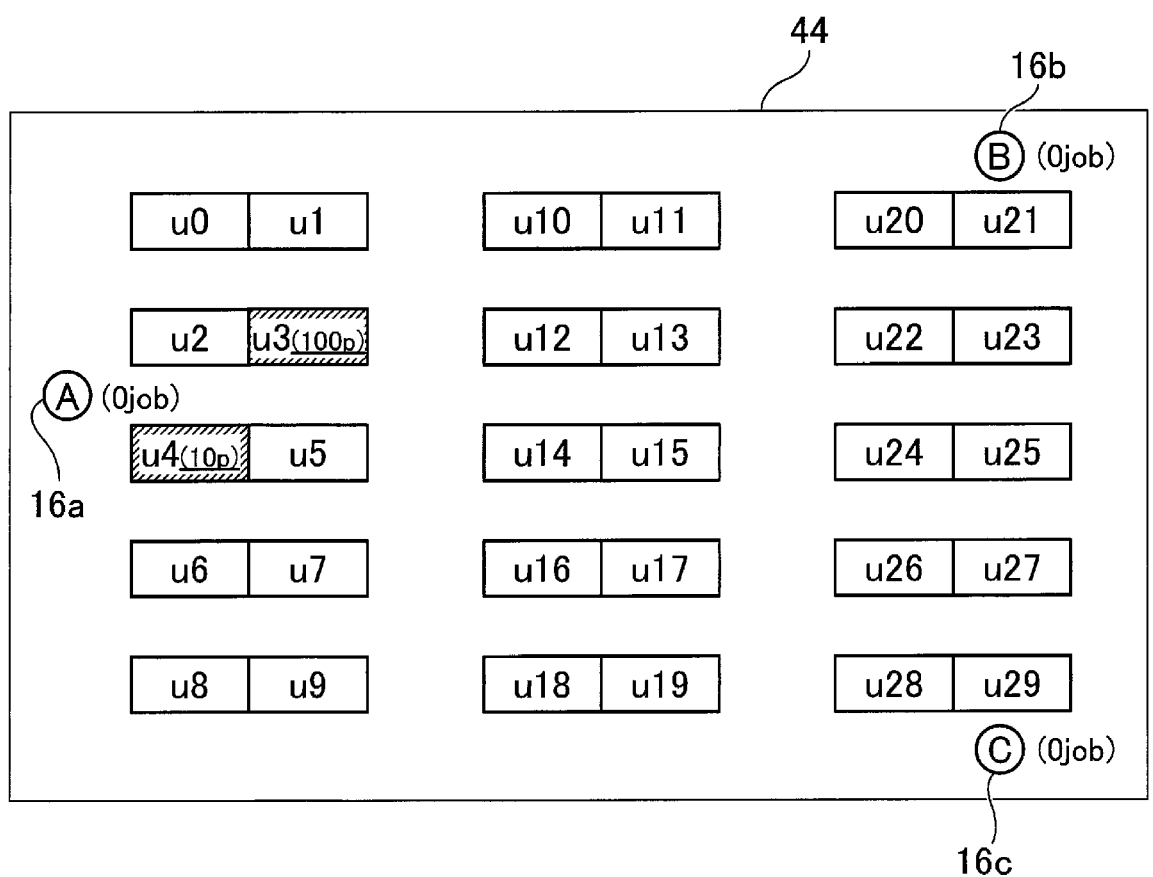
FIG. 11 is a configuration diagram illustrating the disposition of three image forming apparatuses and two users in the office.
Figure 12:
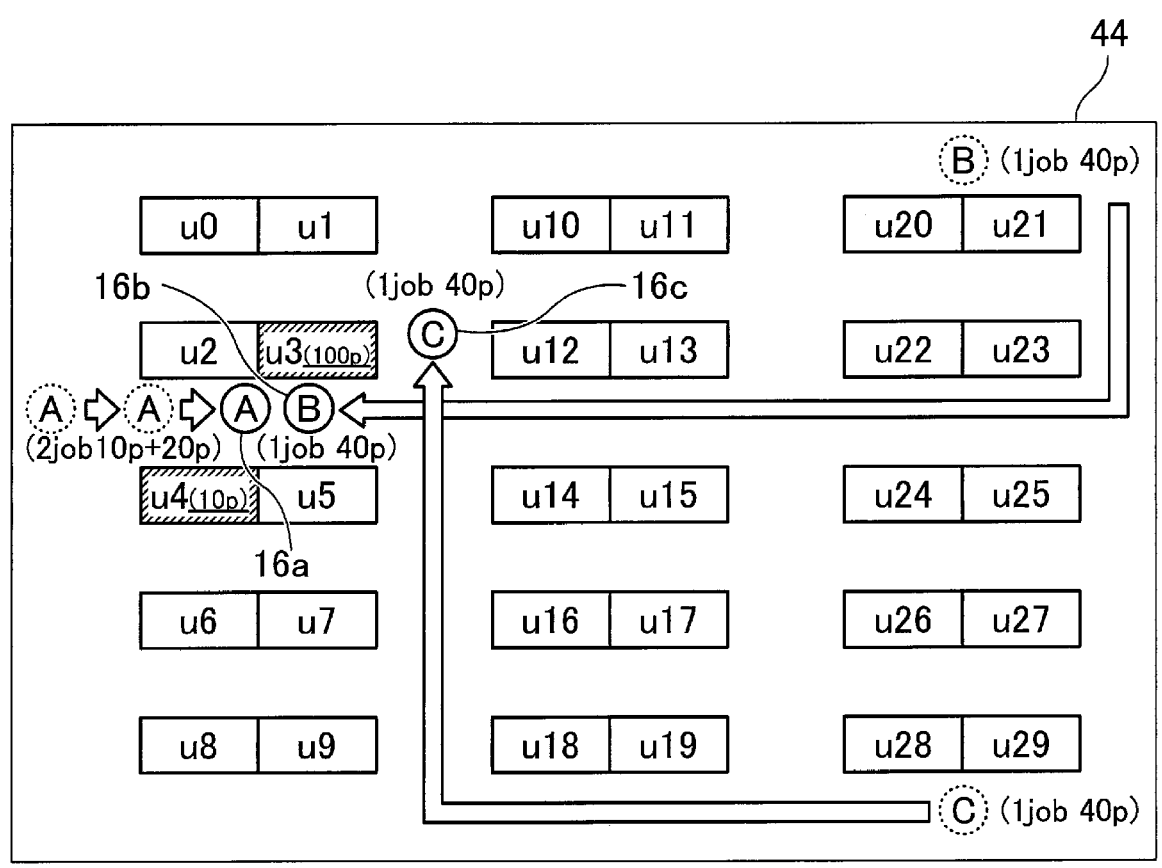
FIG. 12 is a configuration diagram illustrating moving routes of the image forming apparatuses in a case where the two users input a printing job of ten pages and a printing job of one hundred pages, respectively, in the office.

Next, it assumed that the user u3 has input a printing job of printing one hundred pages and the user u4 has input a printing job of printing ten pages as illustrated in FIG. 11. In this case, as illustrated in FIG. 12, first, the image forming apparatus 16a moves to the location of the user u4 and executes the printing job of printing ten pages. Next, the image forming apparatus 16a moves to the user u3 and executes a portion of the printing job of printing one hundred pages, for example, printing of twenty pages. Meanwhile, the image forming apparatuses 16b and 16c move to the location of the user 3 and each of the image forming apparatuses 16a and 16c executes printing of forty of the one hundred pages, for example. As described above, printing processing is finished quickly when printing jobs are shared by the image forming apparatuses 16a, 16b, and 16c.

Figure 13:
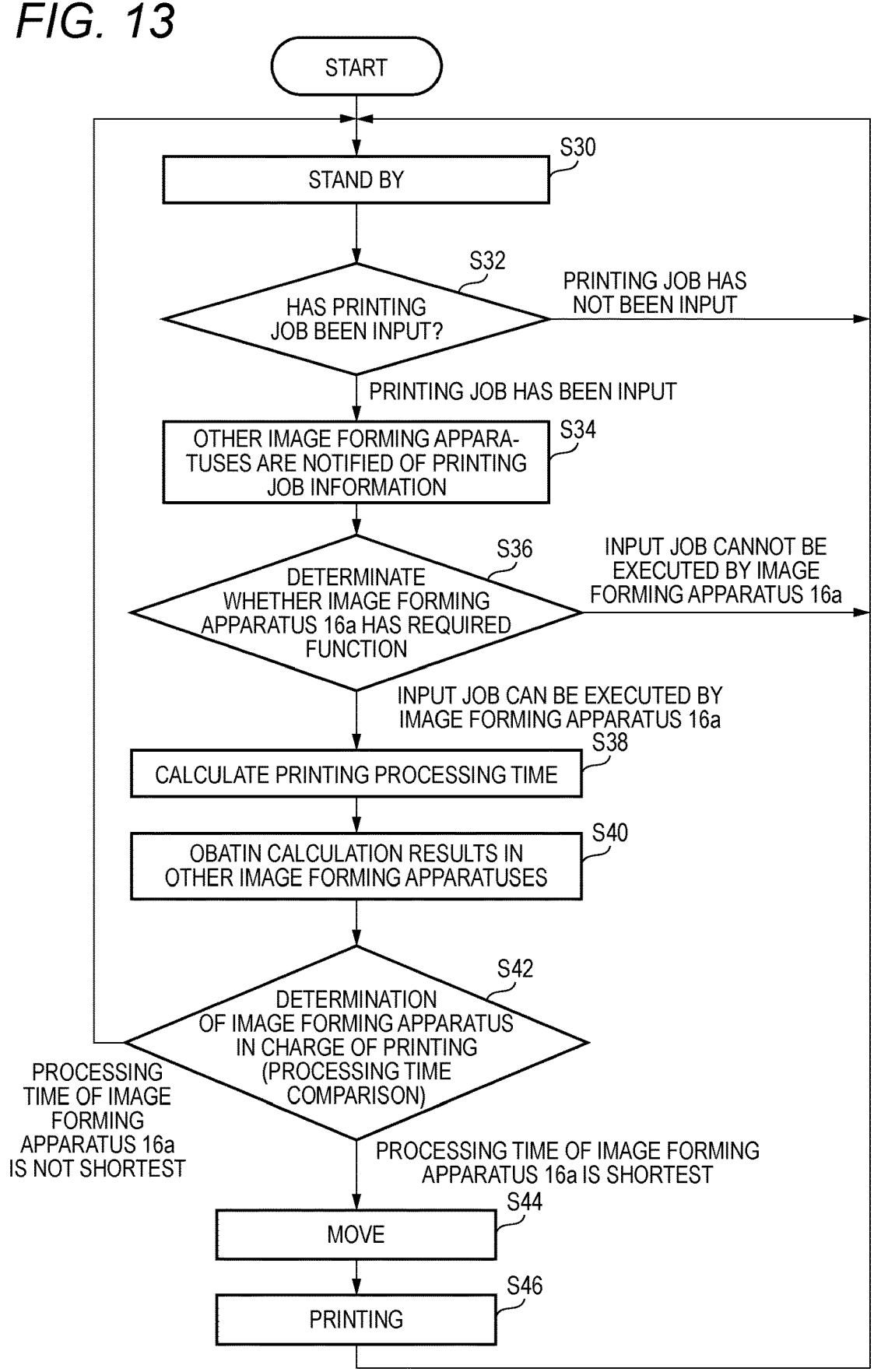
FIG. 13 is a flowchart illustrating a control flow of a control device according to a second exemplary embodiment of the present invention.

FIG. 13 is a flowchart illustrating a second exemplary embodiment of a control flow of the control device 24.

In the above-described first exemplary embodiment, the image forming apparatuses share the statuses thereof with each other. In the second exemplary embodiment, the image forming apparatuses share printing job information.

That is, in Step S30, the image forming apparatus 16a stands by until a printing job is input. Next, in Step S32, it is determined whether a printing job has been input or not. In a case where it is determined that a printing job has not been input in Step S32, the processing returns to Step S30 and the image forming apparatus 16a enters a stand-by state. In a case where it is determined that a printing job has been input in Step S32, the processing proceeds to Step S34.

In Step S34, the other image forming apparatuses are notified of the input printing job information, and the processing proceeds to Step S36. In Step S36, it is determined whether the image forming apparatus 16a has a required function, for example, a function of executing color printing or dual side printing. In a case where it is determined that the input job cannot be executed by the image forming apparatus 16a in Step S36, the processing returns to Step S30 and the image forming apparatus 16a enters the stand-by state. In a case where it is determined that the input job can be executed by the image forming apparatus 16a in Step S36, the processing proceeds to Step S38, and the printing processing time is calculated as in the above-described first embodiment.

Next, since the printing processing times of the other image forming apparatuses are calculated in the same way, in Step S40, the image forming apparatus 16a obtains the calculation results in the other image forming apparatuses, and the processing proceeds to Step S42. In Step S42, the image forming apparatus 16a compares the printing processing time of the image forming apparatus 16a with the printing processing times of the other image forming apparatuses to determine an image forming apparatus in charge of printing. That is, an image forming apparatus with the shortest printing processing time is decided as an image forming apparatus in charge of printing. In a case where it is determined that the image forming apparatus 16a is not an image forming apparatus in charge of printing in Step S42, the processing returns to Step S30, and the image forming apparatus 16a enters the stand-by state again. In a case where it is determined that the image forming apparatus 16a is an image forming apparatus in charge of printing in Step S42, the processing proceeds to Step S44 and the image forming apparatus 16a moves to the location of the user. Then, the processing proceeds to Step S46 and the image forming apparatus 16a performs printing. Thereafter, the processing returns to Step S30.

In the second exemplary embodiment, the printing job is shared by the image forming apparatuses 16a, 16b, and 16c at the same time. However, the printing job may be shared by the image forming apparatuses 16a, 16b, and 16c in the order of the image forming apparatus 16a, the image forming apparatus 16b, and the image forming apparatus 16c, for example.

Figure 14:
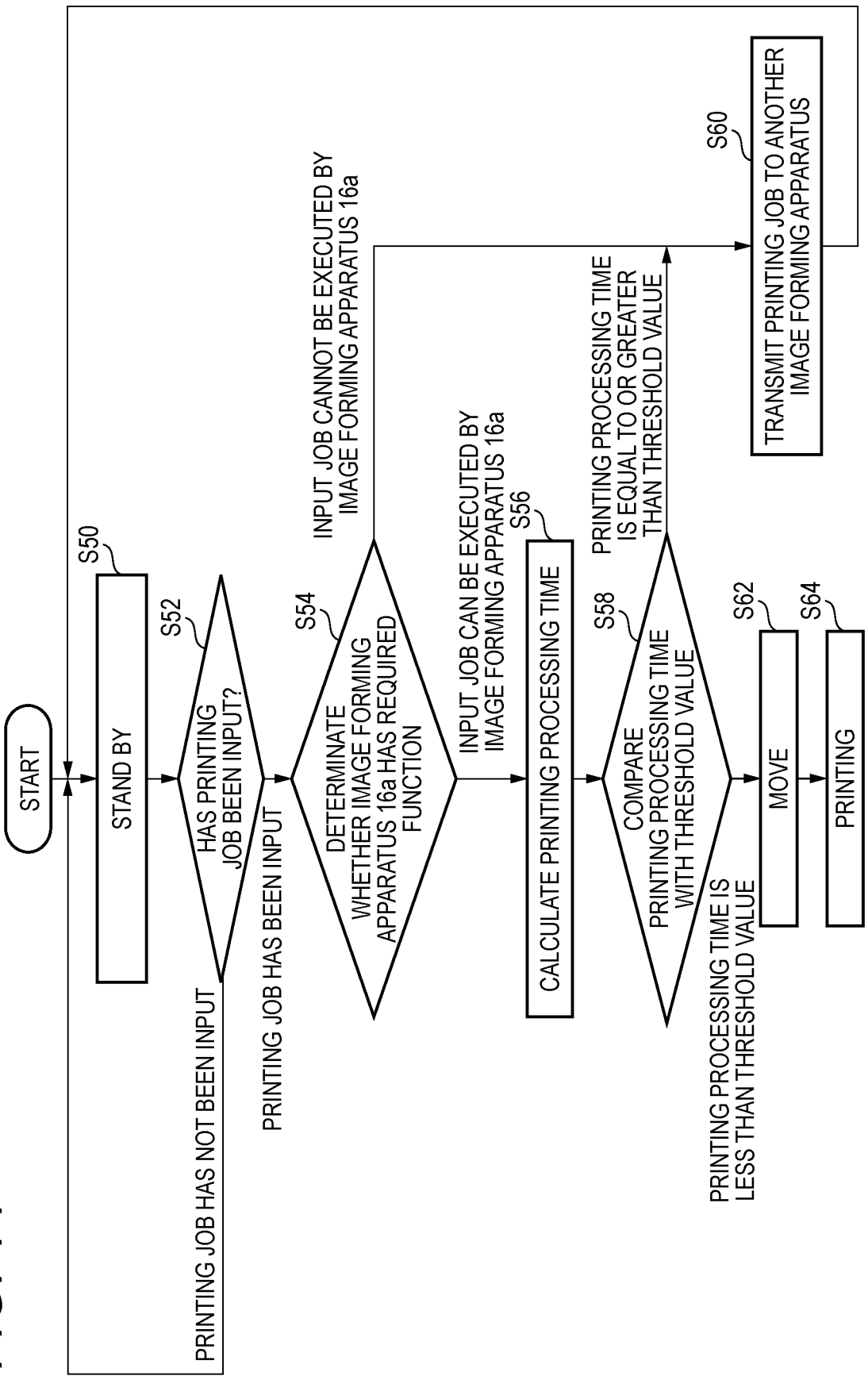
FIG. 14 is a flowchart illustrating a control flow of a control device according to a third exemplary embodiment of the present invention.
Figure 15:
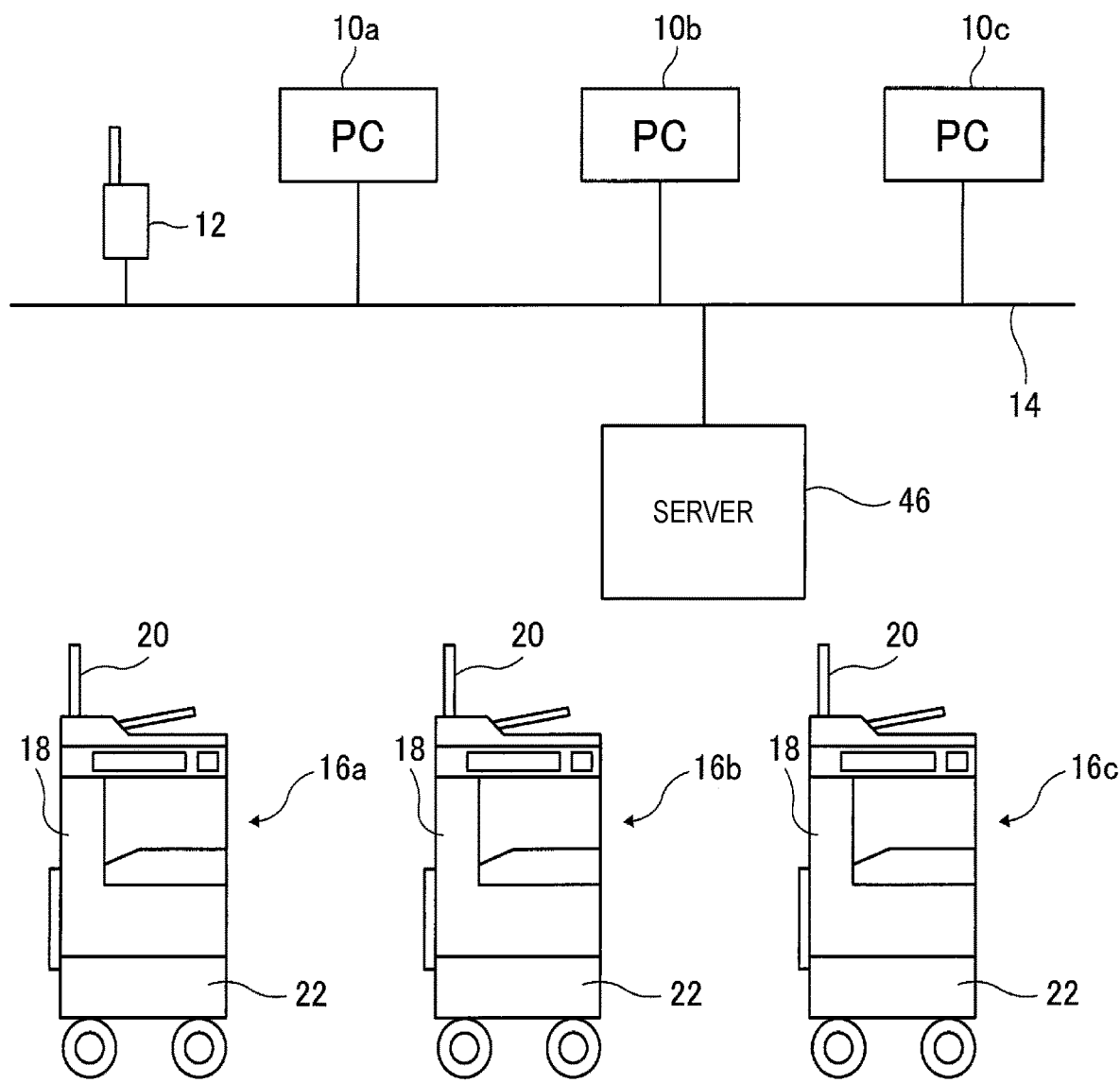
FIG. 15 is a system diagram illustrating a configuration of a processing apparatus system according to another exemplary embodiment of the present invention.

FIG. 14 is a flowchart illustrating a third exemplary embodiment of a control flow of the control device 24.

In the above-described first and second exemplary embodiments, the image forming apparatuses share the statuses thereof or share the printing job information. However, the third exemplary embodiment is related to a case where the image forming apparatuses do not share information.

That is, in Step S50, the image forming apparatus 16a stands by until a printing job is input. Next, in Step S52, it is determined whether a printing job has been input or not. In a case where it is determined that a printing job has not been input in Step S52, the processing returns to Step S50 and the image forming apparatus 16a enters a stand-by state. In a case where it is determined that a printing job has been input in Step S52, the processing proceeds to Step S54.

In Step S54, it is determined whether the image forming apparatus 16a has a required function, for example, a function of executing color printing or dual side printing. In a case where it is determined that the input job cannot be executed by the image forming apparatus 16a in Step S54, the processing returns to Step S56 and the printing job is transmitted to another image forming apparatus. In a case where it is determined that the input job can be executed by the image forming apparatus 16a in Step S56, the processing proceeds to Step S58, and the printing processing time is calculated as in the above-described first embodiment.

Next, in Step S60, it is determined whether the printing processing time which is calculated in Step S58 is equal to or greater than a predetermined threshold value. In a case where it is determined that the printing processing time is equal to or greater than a predetermined threshold value in Step S60, the processing proceeds to Step S56, and the printing job is transmitted to another image forming apparatus. In a case where it is determined that the printing processing time is less than a predetermined threshold value in Step S60, the processing proceeds to Step S62 and the image forming apparatus 16a moves to the location of the user. Then, the processing proceeds to Step S64 and the image forming apparatus 16a performs printing. Thereafter, the processing returns to Step S50.

FIG. 13 is a system diagram illustrating a configuration of a processing apparatus system according to another exemplary embodiment of the present invention.

In the above-described exemplary embodiments, an image forming apparatus in charge of printing is determined through communication between the image forming apparatuses or an image forming apparatus determines an image forming apparatus in charge of printing by itself. However, in this exemplary embodiment, a server 46 is used for the determination.

The server 46 is connected to the network 14 and receives a printing job from the personal computers 10a to 10c. The server 46 stores statuses, performance, and functions of the image forming apparatuses 16a to 16c. When the server 46 receives a printing job, the server 46 calculates printing processing times of the image forming apparatuses 16a to 16c, determines an appropriate image forming apparatus from the image forming apparatuses 16a to 16c, and controls the image forming apparatuses 16a to 16c such that the appropriate image forming apparatus moves to the location of a user and performs printing at the location of the user.

In this exemplary embodiment, the server 46 is connected to the personal computers 10a to 10c via the wired network 14. However, the server 46 may be connected to the personal computers 10a to 10c via a wireless local area network and the server 46 may be connected to the personal computers 10a to 10c via the internet using cloud computing.

In addition, the processing apparatus in the exemplary embodiments is the image forming apparatus. However, the invention can be applied to other processing apparatuses, for example, a moving image reproduce processing apparatus, a delivery apparatus, or an apparatus which is used to assemble or disassemble a machine.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus system comprising:
a plurality of image forming apparatuses that perform processing,
wherein each image forming apparatus includes:
a wireless communication unit configured to receive and transmit printing data; and
a central processing unit (CPU) configured to:
calculate printing processing times for each image forming apparatus, each printing processing time including a movement time of the image forming apparatus and at least any one of a warm-up time, a first copy out time, a continuous copy speed of each image forming apparatus, and an estimated printing time for a job in a print job queue which has not been executed in a case where the wireless communication unit receives the printing data; and
when the printing processing time of an image forming apparatus that has received a printing job is not a shortest printing processing time, transmit the received printing job to another image forming apparatus having the shortest printing processing time.

2. The image forming apparatus system according to claim 1,
wherein the plurality of image forming apparatuses share respective statuses of the plurality of image forming apparatuses with each other.

3. The image forming apparatus system according to claim 1,
wherein the plurality of image forming apparatuses share data to be processed.

4. The image forming apparatus system according to claim 1,
wherein the CPU is further configured to control movement of the image forming apparatus with the shortest printing processing time.

5. The image forming apparatus system according to claim 1,
wherein the CPU calculates the printing processing time based on performance of the image forming apparatus.

* * * * *